(12) United States Patent
Barrett et al.

(10) Patent No.: US 7,543,193 B2
(45) Date of Patent: Jun. 2, 2009

(54) SERIAL DATA VALIDITY MONITOR

(75) Inventors: Ian Gordon Barrett, Saskatchewan (CA); Gregory J. Erker, Saskatoon (CA); Michael James Smith, Saskatoon (CA); Scott Arthur Muma, Saskatoon (CA); Jeffrey S. Roe, Saskatoon (CA); Bernard Guay, Vancouver (CA)

(73) Assignee: PMC-Sierra, Inc., Santa Clara, CA (US)

( * ) Notice: Subject to any disclaimer, the term of this patent is extended or adjusted under 35 U.S.C. 154(b) by 808 days.

(21) Appl. No.: 10/860,548

(22) Filed: Jun. 2, 2004

(65) Prior Publication Data

US 2005/0025195 A1    Feb. 3, 2005

Related U.S. Application Data

(60) Provisional application No. 60/475,577, filed on Jun. 2, 2003.

(51) Int. Cl.
*G06F 11/00* (2006.01)
(52) U.S. Cl. .................................. 714/48; 370/907
(58) Field of Classification Search ............ 714/49–51, 714/704, 799, 800, 818, 819–820, 47, 724, 714/744, 811, 48; 370/395.51, 907, 57, 372
See application file for complete search history.

(56) References Cited

U.S. PATENT DOCUMENTS

| | | | |
|---|---|---|---|
| 5,400,361 A | | 3/1995 | Brauns et al. |
| 5,506,870 A | | 4/1996 | Brauns et al. |
| 5,589,683 A | | 12/1996 | Nakai |
| 5,598,431 A | | 1/1997 | Lobel |
| 5,621,720 A | * | 4/1997 | Bronte et al. ............... 370/241 |
| 6,507,012 B1 | | 1/2003 | Medard et al. |
| 6,892,336 B1 | * | 5/2005 | Giorgetta et al. ............ 714/704 |
| 2006/0200708 A1 | * | 9/2006 | Gentieu et al. .............. 714/704 |

\* cited by examiner

*Primary Examiner*—Tu X Nguyen
(74) *Attorney, Agent, or Firm*—Townsend and Townsend and Crew

(57) ABSTRACT

A data detection system includes, in part, a CID detector, a DC balance monitor and a transition density detector. The CID detector is configured to detect whether the received data stream includes a CID exceeding a predetermined threshold count. The DC balance monitor is configured to detect DC imbalances in the incoming data and that may be indicative of errors in the data. The transition density detector is configured to detect whether a minimum transition density exists during a given time period. If a violation is detected by any one of these three detectors, an out-of-frame signal is asserted. The incoming data stream may be a scrambled SONET or SDH data stream.

32 Claims, 5 Drawing Sheets

SERIAL DATA VALIDITY MONITOR

CROSS-REFERENCES TO RELATED APPLICATIONS

The present application claims benefit under 35 USC 119 (e) of U.S. provisional application No. 60/475,577, filed on Jun. 2, 2003, entitled "Serial Data Validity Monitor," the content of which is incorporated herein by reference in its entirety.

BACKGROUND OF THE INVENTION

The present invention relates to communications networks, and more particularly to detecting the validity of scrambled SONET/SDH serial data streams transmitted between integrated circuit devices used in such networks.

Demand for high performance communication networks capable of transporting multiple types of data, such as text, audio and video data, is on the rise. To carry greater amounts of data over existing communication channels, such as fiber-optic communication channels, network carriers are increasingly using high bandwidth technologies, such as SONET optical carrier (OC) level 48 and OC level 192. Such communication networks rely upon high-performance Add/Drop multiplexers, digital cross connect switches, and multi-service provisioning platforms. To fully utilize the high bandwidth capability of existing fiber optic communication channels, typically data is transmitted through such channels using some form of multiplexing. One form of multiplexing used is called Time Division Multiplexing (TDM).

In accordance with the TDM technique, data bits associated with different channels are interleaved in the time domain to form a composite bit stream. In other words, TDM puts multiple lower rate data streams into a single higher rate data stream. The block that combines the lower rate streams at the source (transmitting) end of a communication link is known as a multiplexer. The multiplexer receives the input streams from N lower rate channels, breaks each stream into segments, also known as grains, and assigns the grains to a higher rate channel in a rotating, repeating sequence. The frequency of the higher rate channel is N times the frequency of the lower rate channels. At the receiving end of the link, the received streams are separated out by means of a block called a demultiplexer. The demultiplexer regenerates each lower rate stream by extracting one grain from every N grains of the higher rate stream using the same rotating, repeating sequence used by the multiplexer. A two-way communication link requires a multiplexer/demultiplexer at each end of the link.

FIG. 1 is a simplified high-level block diagram of an add/drop multiplexer 10, as known in the prior art. Add/drop multiplexer 10 is shown as including line cards 12, 14, 16 which transmit and receive SONET OC-48 or OC-192 or similar SDH data streams, described below, via optical or electrical communication links. The line cards contain framers which terminate the section portion of the transport overhead of the received SONET/SDH frames, described further below. Each link may include a number of physical links. Line card 12 is shown as including 4 links each configured to receive and transmit an OC-48 data stream. Line card 14 is shown as including 2 links each configured to receive and transmit an OC-192 data stream. Line card 16 is shown as including 8 links each configured to receive and transmit an OC-48 data stream. After terminating the SONET section overhead on received data, each line card forwards its processed data to a switch 18, which may be a switch fabric, over electrical or optical interconnect links.

Switch 18 frames, aligns and descrambles the data it receives from the line cards. Switch 18 subsequently decomposes the grain groups on each stream into grains, and rearranges and adds and/or drops the various grains according to user settings, thus forming new grain groups. The new grain groups are then forward to a transmitter logic within the switch which among other things, scrambles and serializes the data, and transmits this data out to the line cards using other links (not shown).

Two commonly known standards referred to as synchronous optical network (SONET) and Synchronous Digital Hierarchy (SDH) define a synchronous frame structure for transmitting signals using time division multiplexing. The basic building block of a SONET frame, commonly referred to as synchronous transport signal-1 (STS-1) includes 810 bytes that are transmitted every 125 μsec. Therefore a SONET channel carrying STS-1 frames (i.e., an STS-1 pipe) has a bit rate of 51.84 Mb/s, which has a corresponding optical signal referred to as OC-1. The SDH standard defines a similar signal hierarchy. All STS-1 signals repeatedly send a frame of information every 125 μsec, regardless of the rate of the multiplexed signal that contains them. Both the SONET and SDH standards require the use of the same framing pattern and scrambling algorithm.

Many STS-1 pipes may be time division multiplexed to achieve higher bandwidths. For example, 3 STS-1 pipes may be multiplexed to form an STS-3 frame, thus to achieve a bit rate of 155.52 Mb/s. Using TDM, many STS-1 data streams can be combined and processed as a single data stream. In an add/drop multiplexer, multiple higher rate data streams can be decomposed into their constituent STS-1 streams which can then be recombined into new higher rate data stream for transport elsewhere in the communications network.

A standard SONET STS-1 frame includes 3-bytes of transport overhead (TOH) followed by 87-bytes of the synchronous payload envelope (SPE), collectively referred to as a row. This format is repeated 9 times to form a total of 90×9 bytes containing 27 bytes of TOH spread over 9 rows and 783 bytes of SPE spread over 9 rows. The first two bytes of the first row of a frame identify the frame boundary. These bytes are referred to as the A1 and A2 bytes. The contents of the A1 and A2 bytes are the 8 bit values F6h and 28h respectively. The h suffix denotes that these values are written in hexadecimal notation, or are of base 16 instead of decimal notation, or base 10. When, for example, 48 STS-1 frames are multiplexed to form an STS-48 frame, the resulting STS-48 frame includes an A1 byte from each of the 48 STS-1 frames followed by the A2 byte of each of the 48 STS-1 frames, and that is followed by the remaining bytes of each of the 48 STS-1 frames. In an STS-1 frame, the J0 byte follows the A1 and A2 bytes. When multiple STS-1 frames are multiplexed together to form a higher rate frame, the first J0 byte retains the J0 designation while the remaining J0 bytes are referred to as the Z0 bytes. For example, in an STS-48 framed composed of 48 STS-1s frames, at the start of the STS-48 frame, 48 A1 bytes are followed by 48 A2 bytes followed by 1 J0 byte followed by 47 Z0 bytes. The contents of the J0/Z0 bytes are user defined and care must be taken in ensuring these bytes contain sufficient bit transitions so as to not create data stream recovery problems at the receiver. This will be discussed in more detail shortly.

SONET/SDH frames, when transmitted serially, are sent in byte order with the most significant bit of each byte transmitted first. To randomize the data for serial transmission, the frame bytes, except the A1, A2, J0/Z0 bytes, are scrambled using a polynomial defined by the SONET standard. The physical interfaces to the transmission medium, for both electrical or optical transmission mediums, require a non-return to zero coding technique. This is because data recovery at the receiver is often performed by a phase locked loop (PLL), or other control locked-loops, which requires regular bit transitions in the received data stream in order to properly recover the data bits in the stream. Scrambling the frames provides sufficient bit transitions in the serial stream to enable the successful recovery of the data.

The A1 and A2 bytes contain sufficient bit transitions, so they do not need to be scrambled and are left unscrambled to allow the receivers to find the start of frame in the data stream. In accordance with the SONET and SDH standards, J0/Z0 bytes are not scrambled. Therefore, users must ensure that the content of these bytes do not contain long sequences of 1 or 0 bits. Equipment compliant with SONET/SDH standards must be capable of receiving a stream of at least 72 consecutive identical digits (CID) or bits without degrading the ability of the PLL to recover subsequent bits. If greater than 72 consecutive identical bits are received by the PLL, the frequency of the PLL may wander, thus increasing the probability that the PLL makes errors while recovering bits from the data stream after transitions resume.

Receivers disposed in SONET/SDH equipment must identify the start of frame of the signals they process so that subsequent bytes within the frame can be identified by their position relative to the start of frame. This is done by identifying the A1/A2 byte pattern in the received data stream using a simple matching technique. SONET/SDH standards require that the start of frame pattern to be found in 2 subsequent frames, each exactly 125 μsec apart, before the framer declares that it has found the frame alignment of the data stream. Once the framer has declared frame alignment, the receiver then unscrambles all the bytes in the frame that follow the A1, A2, J0/Z0 bytes in accordance with the SONET and SDH standards. Similarly, when a framer detects that the A1/A2 boundary is no longer in its expected location, a loss of frame (LOF) condition is declared by the framer once the condition persists for 3 consecutive frames. Framers therefore require a minimum of 375 μsecs (3 frame times) of elapsed time to declare LOF. The LOF condition remains in place until the framer reframes to the incoming signal. As a consequence of declaring LOF, framers may optionally insert an Alarm Indication Signal or AIS pattern into the frame before it is forwarded for further processing. The AIS pattern is created by overwriting the entire frame, except for the A1 and A2 bytes, with the byte value FFh, which corresponds to all 1s in every bit position within the byte. The insertion of the AIS pattern indicates to downstream processing elements that an upstream framer has detected a problem in the data. AIS insertion is done on the unscrambled data stream. Once scrambled for transmission over a serial link to another processing element within the system, the FFh content is converted into a transition rich data pattern, as required for proper data recovery by the downstream device.

In order to determine if a receiver is properly capturing an incoming data stream, the SONET and SDH specifications include a B1 byte in the TOH of each STS-1 frame. The B1 byte contains a bit interleaved parity indication (BIP-8) calculated using the contents of the previous frame. At a transmitter, an 8-bit code is computed using all bits of the previous scrambled data frame and is placed in byte B1 of the current data frame before the current data is scrambled. The BIP-8 code is calculated in such a manner that the first bit of the code provides even parity over the first bit of all 8-bit sequences in the previous frame, the second bit provides even parity over the second bit of all 8-bit sequences within the previous frame, etc. Even parity is generated by setting the BIP-8 bits so that there is an even number of 1s in each monitored partition of the signal. By calculating the value of the B1 byte from the data carried by the frame and comparing it to the actual B1 byte also carried by the frame, the receiver determines whether bit errors occurred in the frame. This method of bit error detection provides an indication of the quality of the received data stream. It is effective at detecting single or an odd number of bit errors in each monitored partition of the signal. It cannot however detect an even number of errors within a partition. This is acceptable since under normal circumstances, few bit errors are seen on SONET streams operating over properly functioning equipment, whereas when equipment fails, most often the failures are catastrophic and may be detected by such methods as LOF, and B1 errors.

TDM switches, of which SONET/SDH switches are a subset, are commonly used to cross-connect lower rate bit streams that are disposed in a higher rate bit stream. The collection of lower rate streams (i.e. grains) that form a higher rate stream is referred to as a grain group. A grain group therefore includes a fixed number of grains.

FIG. 2 illustrates aligned TDM channels that are ready for switching. Assume that N represents the number of STS-1 frames that are multiplexed into a higher rate frame and that each grain group includes G grains. In TDM systems, data is multiplexed according to its location in time. Each data source in a system is aligned to some signal. In SONET, the alignment signal is the 8 kHz clock and the start of frame boundary. A stream within a higher rate stream is identified by its offset from the alignment signal, with an individual datum recurring every G clock ticks. The grain group size G defines the granularity of switching possible in a particular TDM system. Therefore, a data value from a given channel is present every G clock cycles, often referred to as a time slot. For example, one sample from a STS-1 signal forms each grain of a SONET system. An STS-48 signal is formed from 48 such grains, and therefore, the grain group size is 48.

FIG. 3 illustrates an exemplary TDM switching 30, as known in the prior art. In this example, the TDM switch is shown as having n input ports and n output ports (N×N). In FIG. 3, each byte is labeled with a letter representing the input port and a number representing the byte position at the port. As is seen from the output data, bytes may be reordered to any position, or may be multicast to several ports (or a single port). Also, some bytes may be dropped. In output Port Q all the grains, except the second grain, are shown as coming from a single input port. FIG. 3 shows switching of grains within one grain group. The same switching of grains within a grain group is repeated for all grain groups.

Referring to FIG. 1, the high speed serial links coupled between lines cards 12, 14S, 16 may generate a significant amount of crosstalk. As is known, crosstalk is a disturbance caused by the electric or magnetic fields of one signal affecting an adjacent signal. Crosstalk degrades the quality of the impacted signal. Under some circumstances, the impacted signal may be rendered unintelligible. To minimize crosstalk, careful design considerations are often taken into account.

Communications systems containing sub-systems and integrated circuit devices are commonly interconnected via point to point, high speed serial interconnect links, such as that shown in FIG. 1. Because such communication systems often include a large number of high speed serial interconnects that are run in parallel over printed circuit boards and through connectors, a significant potential for crosstalk exists in such systems, as described further below.

Serial link receivers have relatively high sensitivity. This enables various components of a communication system to communicate at high data rates even though they may be physically located on separate circuit boards, e.g., 1 meter or more apart. When interconnect links fail for mechanical or electrical reasons, or due to human action, such as when a circuit board is removed from the system inadvertently or on purpose, the receiver that is disconnected from its transmitter becomes much more susceptible to the crosstalk present in the system. In such cases, the receiver remains attached to the interconnect link but the link is severed at or near the transmitter, leaving the link electrically open ended with no signal driving it. This electrically floating link may act as an antenna and pick up crosstalk from adjacent sources. Therefore, crosstalk occurs when data transitions on an aggressor link (i.e., the link sourcing the data transitions) get capacitively or electromagnetically coupled onto another link. The crosstalk may create data on the open ended link very similar to the data the link originally carried before the transmitter was removed. If the crosstalk is coupled tightly to the receiver of the faulty link, the crosstalk would have dc balance and transition density properties similar to the aggressor SNRZ SONET/SDH data link.

Crosstalk typically causes distortion in the signal coming from the link's intended source. Various design techniques are used to minimize the impact that this distortion has on the receiver. However, if an interconnect link is disconnected from its driver, i.e. is floating, only the crosstalk is seen by the receiver. The receiver may process the crosstalk signal as if it originated from the intended driver.

Because a crosstalk signal is relatively weak, and because only the data transitions are coupled from the aggressor—strings of consecutive bits do not couple well via crosstalk—the received crosstalk signals represent a distorted version of the original data stream. In the absence of any input signal, receivers may report a default received bit of logic one or zero continuously until a signal is applied. The value of the default typically varies from receiver to receiver and is dependent on the process variations within the receiver that occur during manufacturing. As a result, when long strings of identical bits are present in the aggressor data stream, no crosstalk occurs and the receiver reports its default bit value if no other signal is received by the receiver.

Due to limitations that prevent the aggressor data stream from coupling nearly perfectly to the susceptible receiver, the received data stream may contain statistical characteristics similar to a valid signal, however, the crosstalk data may not contain a balance of 1 and 0 bits over the short term or long term, and it may contain an excessive number of consecutive identical digits (CID). Such data streams are corrupted and may be detected as such by the frame identification circuitry coupled to the serial receivers.

In accordance with the SONET and SDH standards, after a framer has achieved frame alignment based on identifying the A1A2 boundary in the SONET frame, the framer will declare a loss of frame after 3 consecutive framing sequences do not appear at the 125 μsec frame interval. Consequently, the framer declares a loss of frame and substitutes a loss of frame data pattern (continuous 1's) for the erroneous data stream. The length of time between the actual loss of a valid data stream due and the detection of the loss of frame is 375 μsec or longer. During this time, a large number of data bits, e.g., tens of thousands of data bits, that may not be DC balanced or may contain long strings of CIDs may be forwarded to a switching device if the reason for the loss of frame was due to the transmitter failing or being removed from the system and crosstalk replaced the legitimate data source. Grains from the faulty stream may then be combined with valid grains from other ports to form a new egress data stream. If the egress stream contains sufficient DC imbalance or excessive CID's, the receiver of the egress stream may not be able to recover the entire data stream. Therefore, due to one or more faulty ingress data stream, grains that are part of valid data stream, may be corrupted.

For example, referring to FIG. 1, assume that the line card which is driving port P is inadvertently disconnected from the system. The receiver on port P of the cross-connect begins seeing crosstalk that contains long strings of CIDs. Output port Q is shown as containing grains mainly from input port P and one grain from input port R. A downstream receiver connected to output port Q may begin making data recovery errors when it encounters the long strings of CIDs. As a result, both valid data grains originating from input port R as well as the crosstalk from port P cannot be accurately recovered from the data stream by the receiver receiving data from output port Q. This is generally considered to be unacceptable performance in the system since faults in the system should not corrupt portions of the system that are otherwise operating properly. In general, the more rapidly a faulty data stream is detected, the less impact the faulty data may have on valid data streams and downstream devices.

Analog signal strength detection circuits which rely on the signal strength of a received signal in order to determine whether the signal is valid, are known. Such circuits, however, may misinterpret crosstalk signal as a valid signal if the crosstalk signal has a relatively high signal strength. One may increase the minimum signal strength threshold in an analog signal detection solution to help differentiate between valid and invalid signals and to reject crosstalk at the receiver. This however tends to limit the maximum interconnect link span within the system since a threshold detector will reject even a valid signal if the magnitude is insufficient at the receiver. The tradeoff between the maximum distance a signal can be propagated in the system and the effectiveness of an analog signal detection circuit may thus be unacceptable. Also, the range of signal strength of valid signals and the range of signal strength of crosstalk signals may overlap, particularly under conditions where an interconnect link is disconnected at the transmitter and leaves the link floating, thus effectively creating an antenna which is quite sensitive to crosstalk.

Another technique used to handle floating interconnects, is to use pull up resistors at the receiver. When a link is disconnected from its driver, the pull up prevents the link from floating and forces it to a supply voltage rail. This has the effect of forcing the receiver to detect a continuous logic 1 or 0 on the link. A digital circuit monitoring the bit stream could be used to detect this CID condition and force the receiver out of frame. This would produce the desired result of eliminating the faulty data from the system. However pull up resistors often reduce the maximum interconnect link span within the system because the transmitting device must produce a signal with sufficient strength at the receiving end to overcome the effect of the pull up resistor during normal operation. This requires that a signal of greater magnitude be present at the receiver than would otherwise be necessary. Another disadvantage of this approach is the relatively long delay time required to achieve a static value at the output of the detector. This delay may be too long to prevent the undesirable effects to the downstream data processing.

Another technique is to incorporate hysteresis to the input receiver characteristics. While this does not give rise to duty cycle distortion and hence jitter, it complicates the signal path, which in turn, poses difficulties for the designers of such circuits as the data rate approaches the limits of the available technology.

BRIEF SUMMARY OF THE INVENTION

In accordance with one embodiment of the present invention, a data stream validity detection system (hereinafter alternatively referred to as detection system) monitors the received data stream to detect invalid data so as to ensure that such data is consistent with characteristics of a scrambled SONET or SDH data stream. The detection system verifies, in part, that the received data stream does not include consecutive identical digits (CID) exceeding a predetermined threshold, that the received data stream is DC balanced over a relatively long time period, and that the received data stream contains a minimum number of transitions within a predefined window of data. If the detection system detects a violation in any one of the above conditions, it forces an out-of-frame, thus forcing the framing logic to begin looking for the framing sequence once again.

In one embodiment, the detection system includes, in part, a CID detector, a DC balance monitor and a transition density detector. The CID detector is configured to detect whether the received data stream includes a CID exceeding a predetermined threshold count. The DC balance monitor is configured to detect DC imbalances in the incoming data that may be indicative of errors in the data. The transition density detector is configured to detect whether a minimum transition density exists during a given time period.

If any one of the CID detector, the DC balance monitor, and the transition density detector detects a fault condition, the receiver is placed into the loss of frame condition and inserts an AIS stream, thus preventing the corrupted data from propagating downstream.

In some embodiments, the B1 byte carried by the frame is included as an extension to the SONET framing algorithm. In such embodiments, in addition to the monitoring actions performed by each of CID detector, DC balance monitor and transition density detector, the framer monitors the B1 byte to detect possible bit errors in the data stream while the framer is attempting to reframe after one of the previous monitors has forced an out-of-frame condition. This reduces the possibility that the receiver goes back into frame alignment when crosstalk is the source of the data stream.

Because each of CID detector, DC balance monitor and transition density detector operate on the received data after the data is processed by an analog receiver, these detectors do not affect the sensitivity of the receiver and allow interconnect links span the maximum distance permitted by the transmitter/receiver pair. Also advantageously, each of these detectors may operate at greater speeds than those known in the prior art. For example, if a CID threshold is set to 80 bits of CID max, a detection system in accordance with the present invention can detect an invalid data source with such a condition in approximately 32 nanoseconds on a 2.488 Gigabit per second link versus approximately 375 microseconds that it would take a conventional framing algorithm to detect the same invalid source.

DETAILED DESCRIPTION OF THE INVENTION

Figure 1:
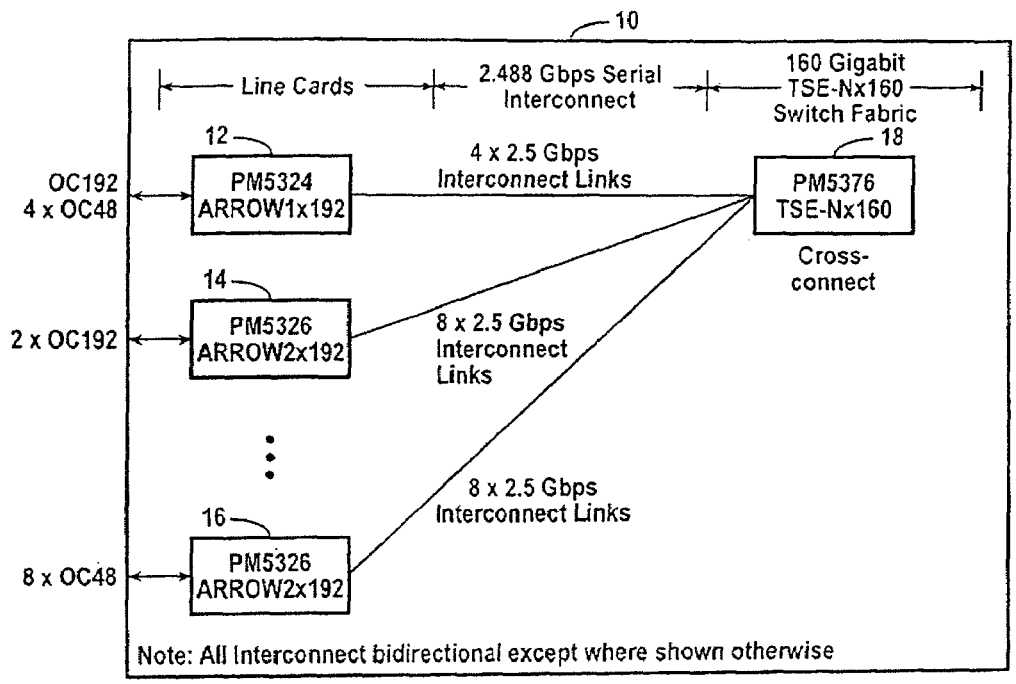
FIG. 1 is a simplified high-level block diagram of an add/drop multiplexer 10, as known in the prior art.

In accordance with one embodiment of the present invention, a data stream validity detection system (hereinafter alternatively referred to as detection system) monitors the received data stream to detect invalid data so as to ensure that it is consistent with characteristics of a scrambled SONET or SDH data stream. The detection system verifies, in part, that the received data stream does not include a series of consecutive identical digits (CID) exceeding a predetermined threshold, that the received data stream is DC balanced within a predetermined threshold over a relatively long time period, and that the received data stream contains a minimum number of transitions within a window of data. If the detection system detects a violation in any one of the above conditions, it forces an out-of-frame condition.

In one embodiment, the detection system includes, in part, a CID detector, a DC balance monitor and a transition density detector. The CID detector detects whether the received data stream includes a CID exceeding a predetermined threshold. Such CIDs may adversely affect downstream devices, inhibiting their ability to recover valid data out of a composite data stream. CIDs may be created under a number of interconnect failure conditions, including floating links that are likely to capture crosstalk energy. To enhance the likelihood that the received data is valid despite being detected as such by the CID detector, the transition density detector is configured to detect that a minimum transition density exists during a given time period. This ensures that the serial data stream contains roughly the same percentage of data transitions as would a typical scrambled SONET or SDH stream. This also ensures that the PLL in a receiver sees sufficient transitions to enable it to recover data without misinterpreting it.

When recovering data on an AC coupled link, the data is required to remain DC balanced in order to prevent the DC blocking capacitor from distorting the data stream. Under certain conditions, Applicants have discovered that the data stream may meet the CID and the minimum transition density requirements and yet fail to be DC balanced. This failure may corrupt data received by downstream receivers. The DC balance monitor detects the DC imbalances to minimize such failures. With each of CID detector, DC balance monitor, and transition density detector, upon detecting a fault condition, the receiver is placed into loss of frame condition and inserts an AIS stream, thus preventing the corrupted data from propagating downstream. Once the framer is out of frame, it attempts to reframe.

In some embodiments, the B1 byte carried by the frame is included in the framing algorithm. In such embodiments, in addition to the monitoring actions performed by each of CID detector, DC balance monitor and transition density detector, the framer monitors the B1 byte to detect possible bit errors in the data stream. This reduces the possibility that the receiver goes back into frame alignment in the presence of invalid data.

Because each of the CID detector, DC balance monitor and a transition density detector operate on the received data after the data is processed by an analog receiver, these detectors/monitors do not affect the sensitivity of the receiver and allow interconnect links span the maximum distance permitted by the transmitter/receiver pair. Also advantageously, such detectors/monitors, in accordance with the present invention, may operate at greater speeds than the conventional loss of frame algorithms. For example, if a CID threshold is set to 80 bits of CID max, a detection system in accordance with the present invention, can detect such a condition in approximately 32 nanoseconds on a 2.488 Gigabit per second link versus approximately 375 microseconds that it would take a conventional framing algorithm to detect the faulty data stream, assuming that the data stream also contains errors in its A1 and A2 framing bytes.

Figure 4:
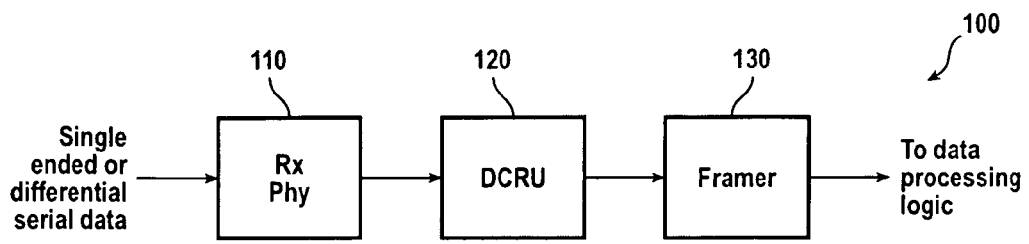
FIG. 4 is a simplified high-level block diagram of an exemplary serial link receiver, in accordance with one embodiment of the present invention.

FIG. 4 is a simplified high-level block diagram of a serial link receiver 100. Serial link receiver 100 is associated with each serial link on a device such as an STS-1 cross-connect switch and is shown as including a receiver physical layer (RX Phy) block 110, a data and clock recovery unit (DCRU) 120, and a framer 130. RX Phy block 110 is configured to receive serial data via an electrical serial interconnect link (not shown). The serial data may be received by Rx Phy block 110 directly (DC coupled) or through a DC blocking capacitor (AC coupled). Rx Phy block 110 amplifies and converts the received data (signal) to standard logic levels, and forwards the converted data to DCRU 120. DCRU 120 block samples and identifies the data bits in the data stream using either a clock recovered from the received data or from an external clock. DCRU 120 may additionally convert the serial data stream it receives to a parallel data stream, e.g., 8 bits wide, in order to allow subsequent processing to occur at a clock rate lower that than the serial data rate. DCRU 120 supplies its output data to framer 130 in which the present invention may be embodied, as described further below.

Figure 5:
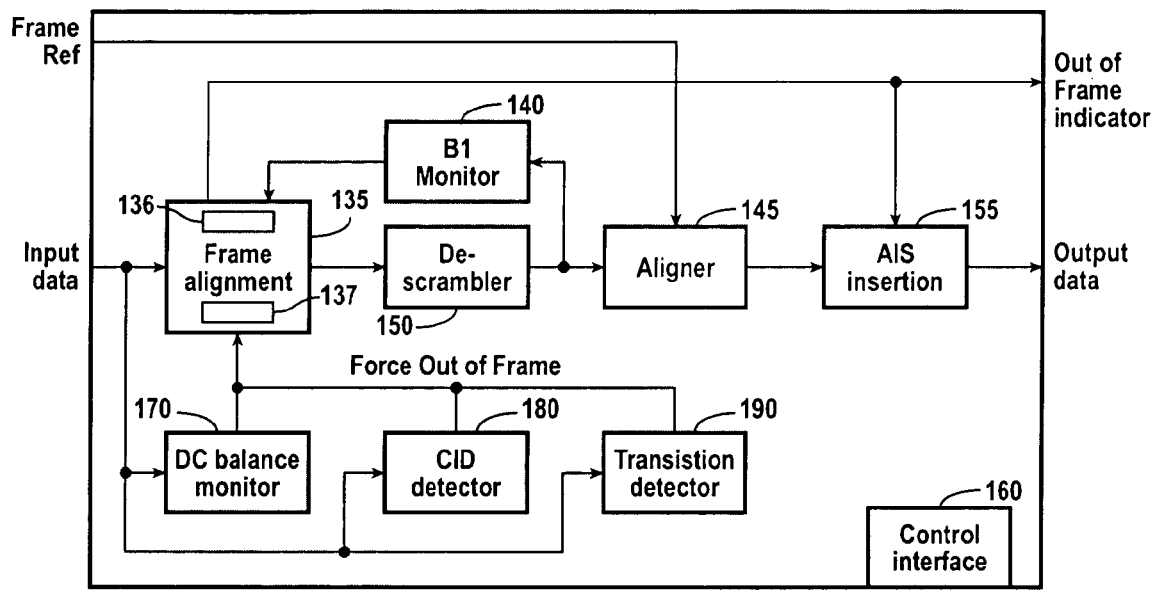
FIG. 5 shows various hardware blocks disposed in an exemplary framer block of FIG. 4, in accordance with one embodiment of the present invention.

FIG. 5 shows various hardware blocks disposed in framer 130, in accordance with one embodiment of the present invention. block. Framer 130 includes, in part, a frame alignment block 135, a B1 monitor 140, an aligner 145, a descrambler 150, an AIS inserter 155, a control interface 160, a DC balance monitor 170, a CID detector 180, and a transition density detector 190. Framer 130 is configured to receive input data stream Input_data, a clock signal at the data rate (not shown) which has the same frequency as the data Input_data, and a frame reference signal Frame_ref, and generate output data stream Output_data, and an out of frame signal Out_of_frame.

Frame alignment block 135 is configured to find the framing pattern within the data stream Input_data. If frame alignment block 135 fails to find the framing alignment pattern in the received data stream, i.e., indicates out of frame condition, frame alignment block 135 causes AIS insertion block 155 to overwrite the input data stream Input_data with the AIS pattern. If frame alignment block 135 finds the framing alignment pattern, frame alignment block 135 causes descrambler block 150 to descramble the scrambled portions of the received data stream.

If B1 monitoring is included in the framing algorithm, frame alignment block 135 first selects a tentative alignment based on the identification of the A1 A2 boundary. Subsequently, descrambler 150 descrambles the received data streams and B1 monitor 140 checks for the presence of bit errors in the received data stream. If a programmable number of frames, e.g., 7, is determined by frame alignment block 135 as having the correct start of frame sequence at the correct interval between frames, and B1 monitor 140 verifies that no B1 errors are detected in each of the frames, frame alignment 135 declares the presence of frame alignment. When B1 monitoring is not included in the framing algorithm, the B1 monitor continuously checks for the presence of B1 errors in each frame and alerts the control interface on the occurrence of each B1 error detected.

Aligner block 145 is configured to align all the received data streams across all of the framers in the integrated circuit device that the framer forms a constituent part of, such as the add/drop multiplexer shown in FIG. 1. DC balance monitor 170, CID detector 180, and transition density detector 190 concurrently monitor the incoming data stream to see if the data adheres to the statistical properties of scrambled SONET data. Each of DC balance monitor 170, CID detector 180, and transition density detector 190 includes a threshold that is controlled by control interface block 160. If DC balance monitor 170 detects that the DC balance of the incoming data stream exceeds the threshold set for DC balance monitor 170, DC balance monitor 170 causes signal Force_out_of_frame to be asserted, which in turn, causes frame alignment block 135 to generate an out of frame condition and AIS inserter 155 to overwrite the incoming data stream. If CID detector 180 detects that CID of the incoming data stream exceeds the threshold set for CID detector 180, CID detector 180 causes signal Force_out_of_frame to be asserted, which in turn, causes frame alignment block 135 to generate an out of frame condition and AIS inserter 155 to overwrite the incoming data stream. Similarly, if transition density detector 190 detects that the transition density of the incoming data stream exceeds the threshold set for transition density detector 190, transition density detector 190 causes signal Force_out_of_frame to be asserted, which in turn, causes frame alignment block 135 to generate an out of frame condition and AIS inserter 155 to overwrite the incoming data stream.

Output data stream generated by framer 130 is descrambled and has been frame aligned to other received data streams. Moreover, control interface 160 is a bi-directional control interface that enables a component external to framer 130 to set the parameters for various blocks disposed in framer 130 and to report the status of these blocks back to such external components.

Frame alignment block 135 initially finds the 8 bit word boundaries within the data stream, and subsequently finds the repeating frame alignment pattern within the data stream. In systems complying with the SONET/SDH standards, the frame alignment pattern is to be found in 3 consecutive data frames, 125 μsec apart, before frame alignment is declared. This standard requires that 144 bits of data (i.e., 3 *(3A1 bytes+3A2 bytes)) out of many more bits of data, as defined by the standard, to be correctly received in 3 consecutive data frames.

Figure 6:
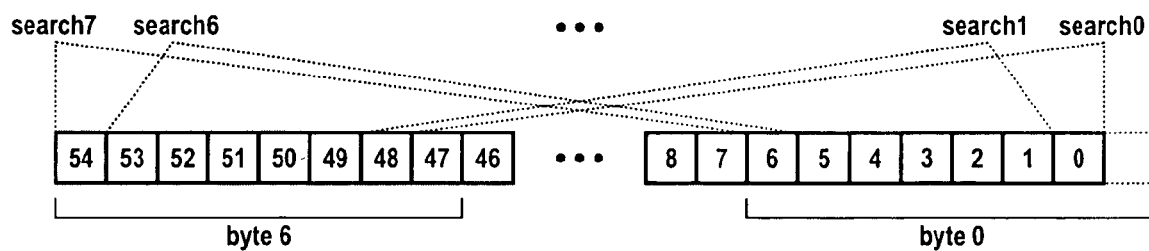
FIG. 6 shows a number of exemplary search patterns that may be performed by the frame alignment pattern search logic disposed in the framer block of FIG. 5.

As seen in FIG. 5, frame alignment block 135 includes, in part, a pattern search logic 136 and a timing block 137. Pattern search logic 136 searches for three A1 characters followed by three A2 characters, namely the hexadecimal pattern F6h F6h F6h 28h 28h 28h. Pattern search logic 136 searches for this six byte sequence across seven consecutive bytes. This pattern may be found in any of 8 positions across the seven bytes, as is shown in FIG. 6. Each position differs from the next by one bit. It is understood that the number of each of A1 and A2 bits used for determining the start of frame boundary may vary from 1 each to the limit of the STS-1 multiplexing contained in the data stream. In the above exemplary embodiment, three A1 and three A2 bytes are chosen as a compromise between the cost to implement and a sufficiently low probability of detecting a false alignment.

In accordance with some embodiments of the present invention, to generate a frame alignment that is less likely to frame to crosstalk signals, framer 130, in addition to requiring that the B1 byte in the data stream match the calculated B1, also requires that a relatively larger number of consecutive framing patterns to be found compared to the standard framing algorithm described in the SONET and SDH standards. Having matching B1s in each frame indicates that there is a low probability that the receive framer block frames to a data stream associated with crosstalk.

Figure 7:
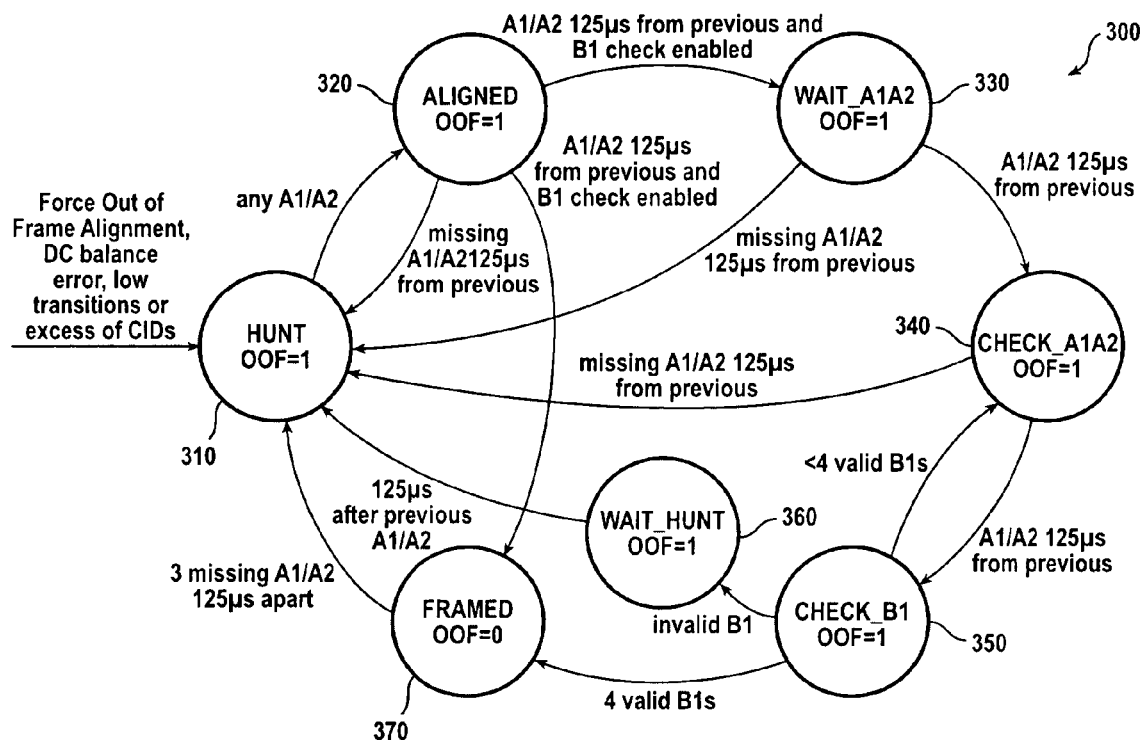
FIG. 7 shows an exemplary state transition diagram associated with a state machine disposed in the pattern search logic of the framer of FIG. 5.

FIG. 7 shows the state transition diagram 300 associated with a state machine in pattern search logic 136 and used for framing of incoming data stream in accordance with one exemplary embodiment of the present invention. The state transition diagram is initially in HUNT state 310 to receive the incoming data. After the framing pattern of 3 A1 bytes followed by 3 A2 bytes is detected, the transition is made to ALIGNED state 320. If the B1 byte checking is enabled, and while in ALIGNED state 320 another framing pattern is detected 125 µsec after the first framing pattern, transition is made to state WAIT_A1A2 state 330. This state is provided to allow time for valid data to be descrambled and received by the B1 monitor to check the validity of the B1 byte in the frame since the B1 byte is used to detect errors in the previous frame. If the B1 byte checking is not enabled, and while in ALIGNED state 320 another framing pattern is detected 125 µsec after the first framing pattern, transition is made to state FRAMED 370. If while in state WAIT_A1A2 state 330, another valid framing pattern is detected at the right time interval, transition is made to state CHECK_A1A2 340. If while in state CHECK_A1A2 state 340, another valid A1A2 framing pattern is detected at the correct time interval, transition is made to state CHECK_B1 350 in which state the validity of the B1 byte is detected by B1 monitor 140. The state machine toggles between the two states CHECK_B1 350 and CHECK_A1A1 340 until 4 B1 bytes and a total of 7 A1/A2 frame boundaries are detected as being free of errors.

If while in state CHECK_A1A2 340, an error in the framing pattern or its expected location in the data stream is detected, the state machine transitions to state HUNT 310. If while in state CHECK_B1 350, an error in the B1 byte match is found, the state machine transitions to state WAIT_HUNT 360. The state machine waits in state WAIT_HUNT 360 for the next framing pattern to be received in the expected interval based on the current assumed frame alignment. This wait is provided so that if the previous alignment was detected from a mimic framing pattern, the state machine does not align to the mimic framing pattern if another framing pattern exists. A mimic pattern is understood as a sequence of 6 bytes that is identical to the A1A2 framing pattern but is not intended to be the framing pattern and may or may not repeat at the same regular interval as does a conventional framing pattern. After waiting until the next expected frame boundary, the state machine transitions to state HUNT 310. If 4 valid B1 bytes and 7 valid A1/A2s bytes are detected, transition from state CHECK_B1 350 to state FRAMED 370 is made. While in state FRAMED 370, if it is detected that three consecutive frames do not have the valid framing pattern frame at the correct time interval, frame alignment is lost and transition is made to state HUNT 310.

An output OOF generated by the state machine is asserted (e.g., set to logic level high) when an out-of-frame-alignment is detected. This signal is unasserted when the state machine is in state FRAMED 370. The state machine may be set to state HUNT 310 to cause out-of-frame-alignment via control interface 160 (FIG. 5) or when either one of a DC balance monitor 170, CID detector 180, or transition density detector 190 detect an error.

Figure 8:
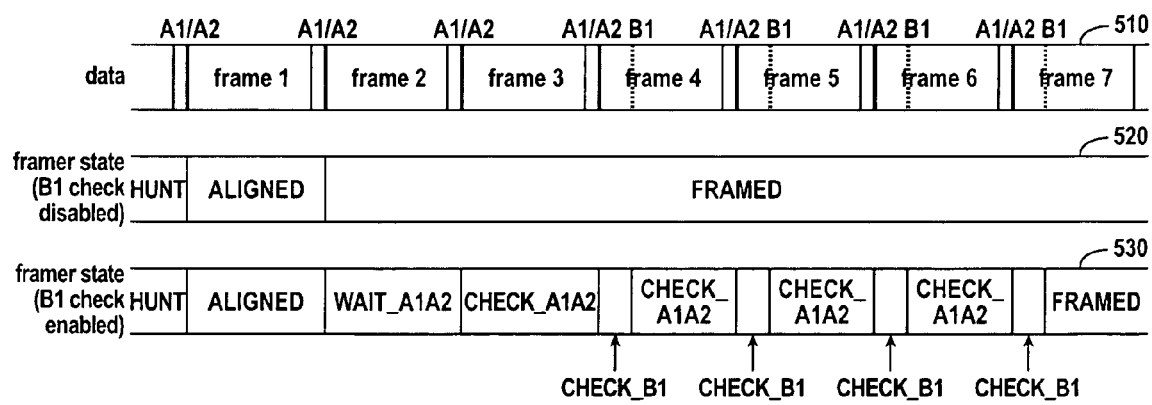
FIG. 8 shows, in part, the timing sequence associated with the framer block of FIG. 5 framing to the incoming data stream.

FIG. 8 shows the timing sequence associated with incoming data stream 510, the timing sequence 520 associated with states of transition diagram 300 when B1 bye checking is not enabled, as well as the timing sequence 530 associated with states of transition diagram 300 when B1 byte checking is enabled. Both the frame boundaries as well as A1/A1 bytes and/or B1 bytes cause these state transitions as shown. As is seen, the state machine waits for the B1 byte in frame 4 due to the delay associated with descrambling the data and then calculating the expected B1 value.

When the transmitter on a link and the receiver on the same link are each contained within separate integrated circuit devices that have been fabricated using different technologies, the transmitter and receiver may rely on separate DC voltage sources at different voltages to drive the data from the transmitter and capture the data at the receiver. These DC voltages are applied to the link by the transmitter and receiver and if they are of different values, unintended DC current will flow from the higher voltage source to the lower voltage source and may damage either device. In such cases a DC blocking capacitor is typically placed in each leg of a differential pair to block the DC current from flowing. Referring to FIG. 5, DC balance monitor 170 tracks the DC voltage accumulated across a DC blocking capacitor on an external interconnect link. This capacitor prevents the independent DC voltages of the transmitter and receiver from being short-circuited through the interconnect link. The DC voltage across this capacitor is ideally maintained at a constant value of $V_{transmitter} - V_{receiver}$, where $V_{transmitter}$ represents the DC voltage at the transmitter, and $V_{receiver}$ represents the DC voltage at the receiver. The voltage across this capacitor changes from this ideal value based on the proportion of ones to zeros in the data stream flowing through the capacitor. Any imbalance in the number of ones and zeroes in the data stream causes the voltage developed across the capacitor to vary. In extreme cases, this can lead to distortion in the data seen by the receiver, a condition known as DC wander.

Scrambled SONET/SDH data is expected not have significant DC content in its spectrum. Therefore any significant discrepancy between the number of ones and zeros on an external link may be indicative of a problem at the transmitter or on the link itself, thus requiring action to inhibit such problems to propagate downstream. A terminating resistor may be used at the receiving end of a serial link to prevent the signal from the transmitter from reflecting when it arrives at the receiver. such a resistor also provides a controlled DC current path that allows the voltage across the capacitor to gradually return to its ideal voltage. If such a resistor is used, DC balance monitor 170 is further adapted to account for the discharging effect of the termination resistor when estimating the charge built up across the capacitor.

To estimate the DC voltage developed across the DC blocking capacitor, a counter's count is incremented by one for every logic 1 bit that is seen by the DC balance monitor 170 and decremented by one for every logic 0 that is seen by DC balance monitor 170. To model the resistor-capacitor (RC) discharging of the DC voltage across the capacitor, a charge decay estimation is implemented. On the DC blocking capacitor, the RC discharging occurs continuously and follows an exponential rate of decay defined by the product of the value of the resistor and the value of the capacitor. This is modeled in the DC balance monitor by removing a fixed percentage of the count accumulated on the imbalance counter at a regular interval. The rate of the decay may be set by the user through control interface 160 by programming the number of clock cycles between decay events, in other words, by setting the period between decay events. The magnitude of the decay is set to a fixed percentage of the accumulated count, for example, 100%, 50%, 25% or 12.5%. If the absolute value of the DC balance count reaches a programmable threshold, an interrupt is sent to the control interface 160. This causes the counter's count to be reset to zero and frame alignment block 135 to be informed via signal Force_out_of_frame to cause signal OOF to be asserted to indicate a loss of frame alignment. Resetting the counter to zero when the threshold is exceeded, enables the interrupt signal to continue to be generated if the situation, persists. DC balance monitor 170 has a relatively small time constant and thus relatively quickly stabilizes to the correct value after being set to zero. It is understood that DC balance monitor 170 is typically disabled for links that are not AC coupled, however the monitor could still be used without decay to monitor the long term DC balance of the Input_data signal.

Figure 9:
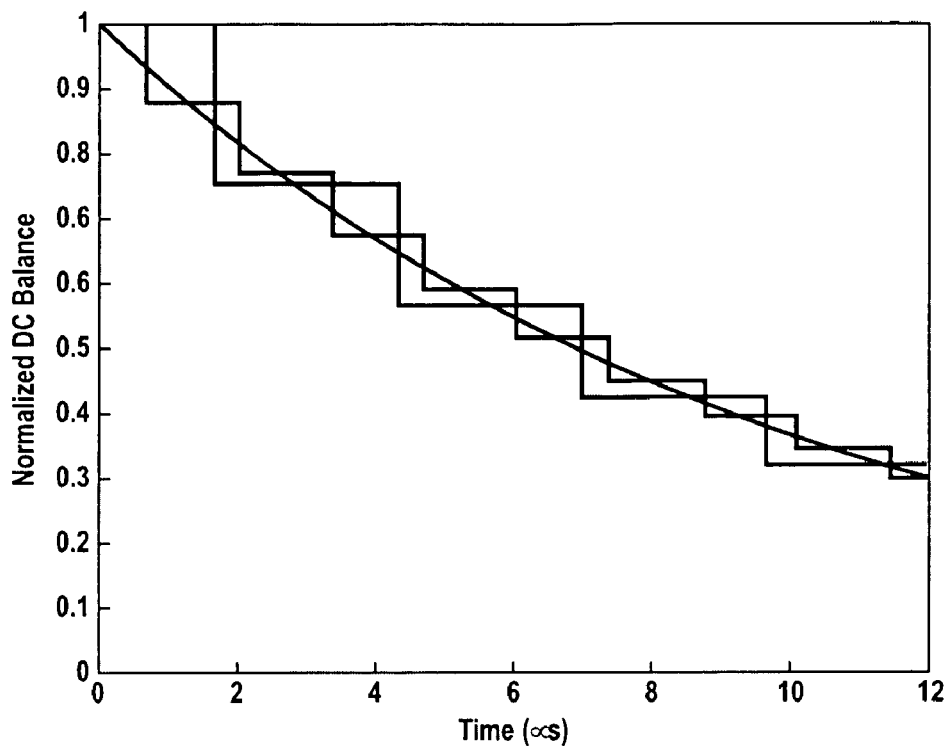
FIG. 9 shows a comparison between theoretical decay of the DC voltage on the DC blocking capacitor in an AC coupled serial interconnect link with the decay calculated by a DC balance monitor disposed in the framer shown in FIG. 5, in accordance with an exemplary embodiment.

DC balance monitor 170 has programmable parameters to provide sufficient flexibility in modeling the external link. The three parameters are the decay period DECAY_PER parameter, the decay factor DECAY_FAC parameter, and the threshold DC_BAL_THRESH parameter. FIG. 9 shows a comparison between the theoretical decay of the DC voltage on a link with the value calculated by DC balance monitor 170. The time constant used in the example of FIG. 9 is 10 μsec which represents the typical RC time constant associated with presently available systems. The data stream is assumed to have a balanced number of ones and zeros. The smooth exponential curve represents the actual voltage. The approximation with smaller steps uses a decay factor of ⅛ and a decay period set to 430. The second approximation uses a decay factor of ¼ and a decay period of 850.

Figure 10:
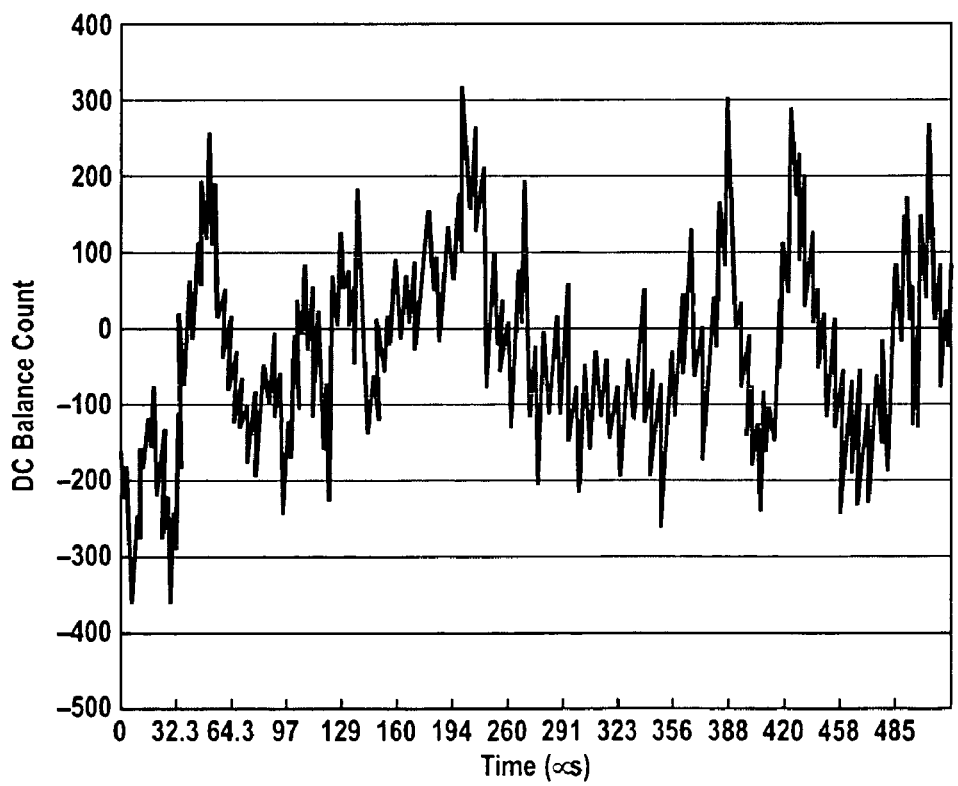
FIG. 10 shows an exemplary DC balance count over a few frames times associated with random scrambled data.

FIG. 10 shows the DC balance count over a few frames times with scrambled random data, which simulates scrambled SONET/SDH data. The decay period is set to 430 and the decay factor is ⅛. Simulations have shown that random data with no bias has maximum DC balance counts of approximately +/−350 counts. With 51% ones and 49% zeros, the maximum DC balance counts are around +/−900. Since normal scrambled SONET/SDH data will have a 1's density between 49.5% and 50.5%, a threshold of 1000 may be advantageous in some embodiments. It is understood that the above numbers are exemplary and are based on a clock period generated by a 311 MHz clock. Other clock rates and time constants may require different decay periods.

Figure 11:
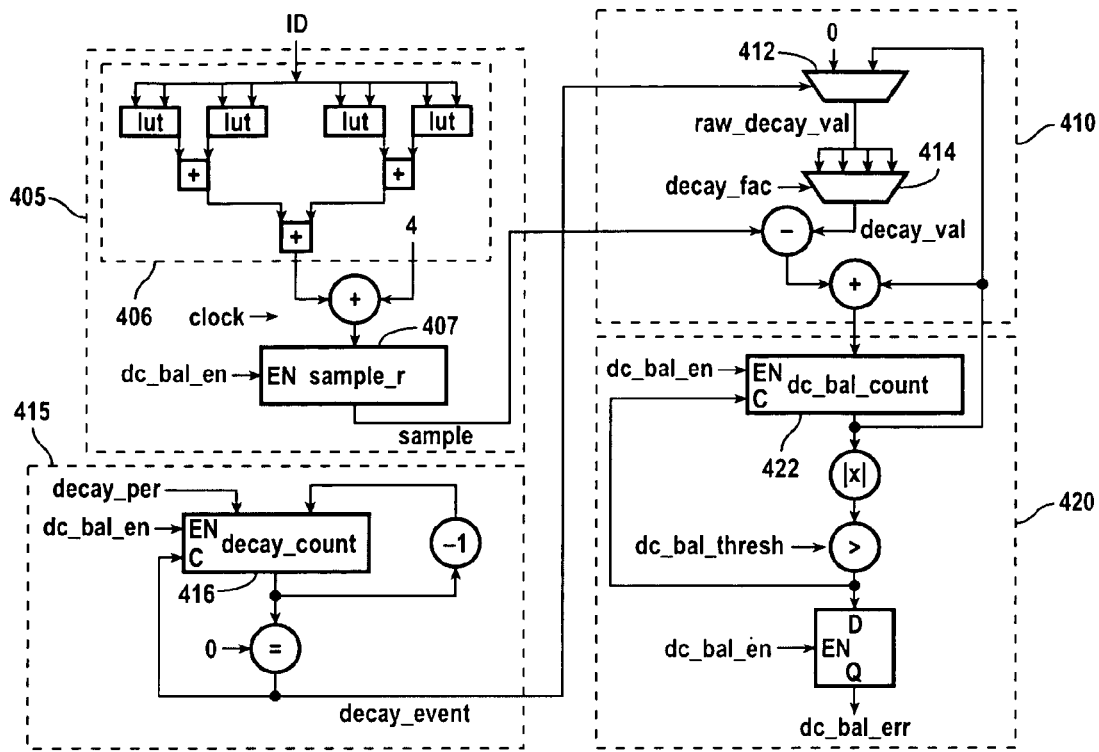
FIG. 11 is a simplified high-level block diagram of DC balance monitor, in accordance with one embodiment of the present invention.

FIG. 11 is a simplified high-level block diagram of DC balance monitor 170, in accordance with one embodiment of the present invention. DC balance monitor 170 includes four functional blocks, namely sample balance calculation block 405, decay timing block 415, accumulation block 415, and error checking block 420. Sample calculation block 405 is configured to calculate the imbalance between logic ones and logic zeros in an 8 bit data word from the data stream. The imbalance is defined as the number of logic ones minus the number of logic zeros in the input data stream ID. For example, the 8 bit data word '11010110' contains 5 ones and 3 zeros therefore the imbalance is 2. The imbalance can also be calculated from the equivalent formula of two times the number of ones minus eight. This can be further simplified at the implementation level to be the number of ones minus four and then multiplying the result by two, i.e., from the previous example (5−4)×2=2. Multiplying by two is easily accomplished in binary arithmetic at the circuit level by appending a zero bit as the least significant bit of the result from the subtraction. Since the difference between the number of 1's and the number of 0's may be negative, a signed logic vector is used to represent the binary value. In some exemplary embodiments, lookup tables (LUT), shown inside dashed perimeter line 406 are used to return the number of ones in a two bit subset of the 8 bit input data. The output of the four shown lookup tables are then added together to determine the number of 1's in the 8 bit word. Block 407 of sample balance calculation block 405 are used to store the results of the operation of subtracting 4 from the number of ones and then performs the appending of the zero to the least significant bit of the result.

Decay timing block 415 is configured to determine the interval at which the DC balance count is to be decayed. On every clock pulse of the clock signal (not shown) applied to DC balance monitor 170, decay counter Decay_Count 416 is decremented by 1. Every time the count of the counter Decay_Count 416 decrements to 0, a decay event is signaled to the Accumulation block 410 via signal Decay_Event, and the decay period is loaded into the counter Decay_Count 416 using signal Decay_Per Signal sample represents the imbalance count provided by the sample calculation block 405. Accumulation block 410 subtracts the value of signal Decay_val from the value of signal Sample. The result is then added to the existing count stored in memory 422 and the added result is stored back in memory 422. When signal Decay_event is not asserted, multiplexer 412 cause the value 0 to be supplied to signal Decay_value via signal Raw_decay_value. When signal Decay_event is asserted, multiplexer 412 causes signal Raw_decay_value to carry the value stored in memory 422. Since this number must represent both positive and negative numbers, a signed bit vector is used to store the DC balance count. The magnitude of the value carried by signal Decay_val is determined, in part, by signal DECAY_FAC. If signal DECAY_FAC is "00", the full amount of the Raw_decay_val is used. This is equivalent to reducing the DC balance count by 100% per decay period. If DECAY_FAC is "01", the Raw_decay_val is reduced by the shifting the value to the right by one bit. This is equivalent to reducing the DC balance count by 50%. Similarly, the Raw_decay_val is reduced by shifting the value two bits to the right if DECAY_FAC is "10". This is equivalent to reducing the DC balance count by 25%. The Raw_decay_value is reduced by shifting the value three bits to the right when DECAY_FAC is set by the user to "11" and is equivalent to reducing the DC balance count by 12.5%. For example assume the DC balance count stored in memory 422 is at 128. This is represented as the binary number 10000000b where the b suffix indicates the binary number base is being used. Assuming Decay_event is asserted, the value 10000000b is carried by signal Raw_decay_val. If DECAY_FAC is set to "00", the signal Decay_val will be set to 10000000b. This value will then be subtracted from the new incoming balance count on Sample, and the result will be added to the original count stored in memory 422. If DECAY_ FAC is set to "01", 1000000b will have its right most or least significant bit removed. Decay_val will therefore be set to 1000000b which is equivalent to 64 in decimal notation or half the original value. When DECAY_FAC is "10", 10000000b is shifted to the right two bits, thus becoming 100000b which is equivalent to 32 or 25% of the original count. When 10000000b is shifted right 3 bits, the value becomes 10000b which is equivalent to 16 or 12.5% of the original value. When a 0 value is right shifted, it remains 0.

Bit shifting to divide a number can give different results depending on whether the dividend is positive or negative. For example, dividing 3 by 4 (accomplished by shifting by 2 bits) results in 0, but dividing −3 by 4 results in −1. The maximum discrepancy is thus no more that 1. Error checking block 420 determines when the DC balance has met or exceeds the programmable threshold set using signal DC_BAL_THRESH. Since the DC balance is signed, the absolute value must first be found. Signal DC_Bal_Error generated by error checking block 420 forces the framer out of frame and sets the DC balance count to zero. To conserve power or disable the monitor, all the registers in DC balance monitor 170 circuit are disabled when signal DC_BAL_EN is '0'.

As described above, CID detector 180 monitors/detects the input data stream to detect CIDs. A continuous stream of ones or zeros may be representative of a problem with the source and may cause problems with downstream devices and clock and data recovery units. In accordance with the present invention, the number of CIDs is counted. If the number of bits with no transitions exceeds a programmable threshold, an interrupt is generated and frame alignment block 135 causes signal OOF to be unasserted to indicate an out of frame alignment condition In accordance with the present invention, transition density detector 190 monitors/detects the incoming data stream to detect whether the incoming data includes sufficient transitions for the CDRU to recover the clock. The transition density detector 190 is adapted to determine if the transition density conforms to that expected in SNRZ SONET/SDH data streams. Transition density detector 190 is adapted to count the number of transitions over a fixed time period of time. If the number of transitions counted in the period is below a configurable value, an interrupt is generated and frame alignment block 135 causes signal OOF to be asserted to indicate an out of frame alignment condition. Transition density detector 190, therefore, allows for a longer term check on the density of data transitions in the data stream whereas CID detector 180 looks for the minimum acceptable number of transitions over a shorter period of time. In some embodiments, the period over which the transition density is examined, could be programmable. For example, if programmed to have a threshold of 80, CID detector 180 does not cause an out of frame alignment if 1 transition occurs for every 79 bits. Such a relatively low transition density (1 out of 79 bits) may be insufficient to allow a DCRU to recover data error free if it is repeated over the long term. Therefore, CID detector 180 would fail to detect errors under such conditions. However, transition density detector 190 detects errors under such conditions because it is looking for a higher transition density over a longer period.

Normal SONET data has a ones density often between 49.5% and 50.5% over a large data sample. Simulations with random data having a ones density of 55% have shown that the minimum number of transitions in 255 bytes, which defines the period over which the transition density is measured, to be 898 transitions (44.0%) in some such exemplary simulations. Having a transition density less than what is normally found in Scrambled SONET/SDH data may be an indication that invalid data is being received and that the data stream should be terminated.

The minimum transition density in the data stream may be application dependent as the SONET payload and scrambling of the payload varies according to the application. The actual minimum transition density of the data stream in any particular system is often determined as part of system design so that the minimum transition density threshold is properly set.

The threshold count may be set to different values depending on the tolerances of the DCRU. If the threshold is set to 0 the transition detector circuit is disabled. A fixed window size may be used, for example 256 bytes, which corresponds to a maximum of 2048 transitions. By counting the transitions per 256 bytes, and comparing that count to the threshold set through the control interface 160, transition density detector 190 forces the frame aligner out of frame when the minimum required transition density count is not met after the period expires. The count is restarted as soon as the threshold is met or the period expires.

In some embodiments, the threshold may be set to, e.g., eight different values each being a multiples of, e.g. 128. If the threshold is set to 0 the transition detector is disabled. If the transition threshold is set to its maximum (7*128=896) value in such exemplary embodiments, a minimum transition density of at least 43.75% is required, otherwise the frame aligner is forced out of frame.

The following table shows transition thresholds that may be used by transition density detector 190 assuming a 256 byte window of data and in accordance with one exemplary embodiment of the present invention.

TABLE 1

Transition Thresholds

| TRAN_THRESH | Threshold | Transition Density |
|---|---|---|
| 0 | disabled | — |
| 1 | 128 | 6.3% |
| 2 | 256 | 12.5% |
| 3 | 384 | 18.8% |
| 4 | 512 | 25.1% |
| 5 | 640 | 31.4% |
| 6 | 768 | 37.6% |
| 7 | 896 | 43.9% |

Figure 12:
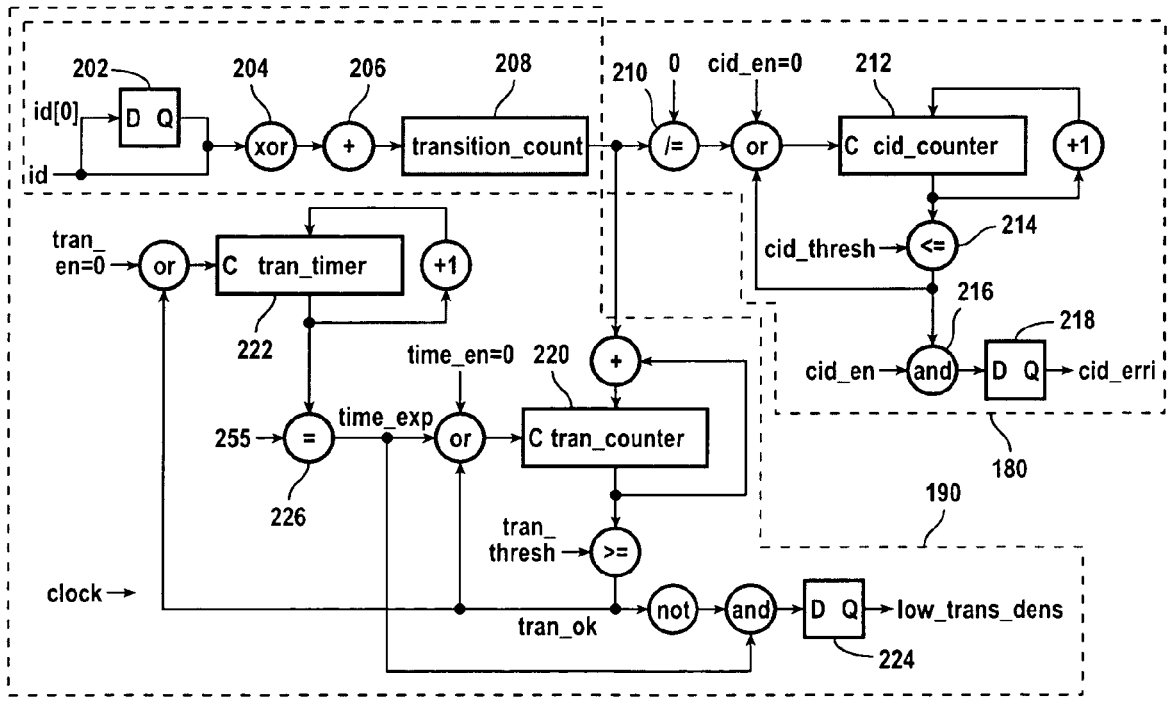
FIG. 12 is a simplified logic block diagram of a CID detector, and a transition density detector, in accordance with one embodiment of the present invention.

FIG. 12 is a simplified logic block diagram of CID detector 180 and transition detector 190. Transition detector 190 and CID detector 180 are shown as sharing logic blocks 202, 204, 206 and 208 to calculate the number of transitions in the current input data byte ID.

The least significant bit (LSB) from the previous byte of signal ID is captured and stored in register 202 to check for transitions across the byte boundaries. Each adjacent pair of bits in the input byte received via signal ID and the captured LSB are logically exclusively ORed (XORed) using XOR gate 204. Adder 206 adds the outputs of XOR 204 to generate the total number of transitions for the byte and across the byte boundary. The transition count for the byte is temporarily store in the register Transition_count 208.

CID_counter 212 increments its count on every pulse from the applied clock signal (not shown). If the output of register 208 which is supplied to comparator 210, is not equal to zero, or if the CID threshold is exceeded CID counter 212 is cleared and set to 0. If the CID count in CID counter 212 becomes greater than or equal to the programmed threshold CID_THRESH, as determined by CID threshold comparator 214, and signal CID_EN is asserted, the output of the logical AND gate 216 is asserted and stored in register 218. This causes signal CID_ERRI to be asserted, indicating the presence of a CID error in the received data. The CID error signal CID_Err is logically ANDed with signal CID_EN because if the CID threshold is zero, the number of CIDs will always meet or exceed the threshold, even when the CID detector is disabled.

As stated above, the number of transitions in each byte is stored in register 208. This number is then added to the value received from counter 220 and stored back in counter 220. The three most significant bits of the transition count stored in transition counter 220 is compared to the transition threshold TRAN_THRESH. If the transition count as stored in transition counter 220 is greater than or equal to the transition threshold, indicating that sufficient transitions exist in the sampling period, signal Tran_ok is asserted. Assertion of signal Tran_ok clears transition timer 222.

Transition timer 222 marks the, e.g., 256 byte intervals, but restarts counting without marking an interval if the threshold is met If transition counter 220 is not cleared by signal Tran_ok prior to counting up to the value 255, signal Time_exp is generated by comparator 226. Signal Time_exp is logically ANDed with the inverse of signal Tran_ok and the result is stored in register 224. Therefore if signal Tran_ok is not asserted and signal Time_exp is asserted, signal Low_trans_dens is asserted to indicate that a low transition density condition has been detected. If signal time_exp is asserted, transition counter 220 is cleared in preparation for the next transition counting period. When signal tran_timer 222 reaches the count of 255, signal Tran_timer returns to a zero count on the next clock pulse to start a new transition counting period.

CID counter 212 remains at a count of 0 when CID_EN is 0. Transition counter 220 and transition timer 222 remain at 0 when signal TRAN_EN is set to 0. The transition count register 208 is always updated with the latest count since it may be used by either of the detectors.

Figure 2:
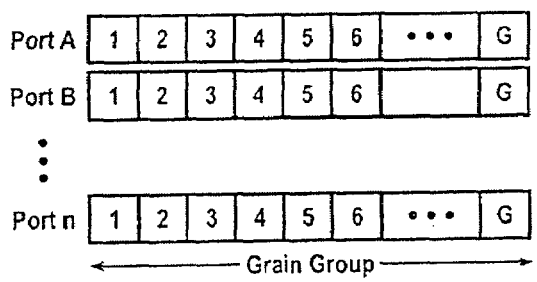
FIG. 2 illustrates aligned TDM channels configured to be switched, as known in the prior art.
Figure 3:
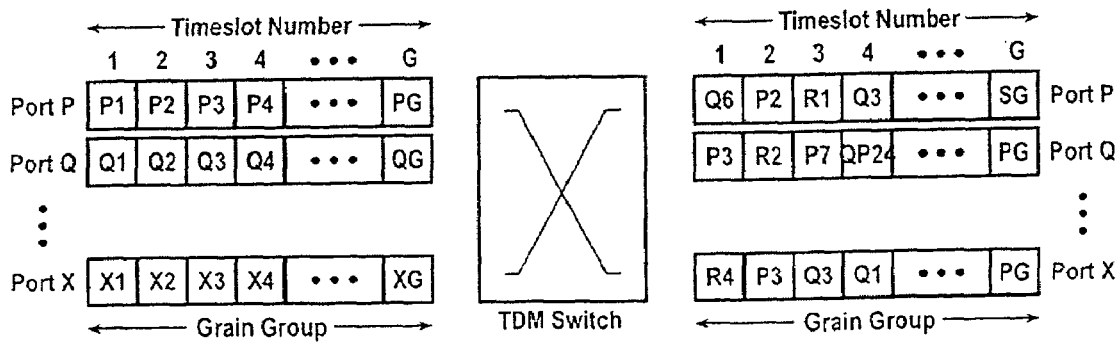
FIG. 3 illustrates time slots and grain group associated with various channels of a TDM switch, as known in the prior art.

The threshold count of transition detector 190 may be set to different values depending on the tolerances of the DCRU. If, for example, the threshold is set to 0, the transition detector circuit is disabled. If a fixed window size of, for example, 256 bytes is used—that corresponds to of 2048 maximum transitions—frame alignment block 135 causes signal OOF to be unasserted to indicate an out of frame alignment, if the transition density count is less than the threshold set by signal TRAN_THRESH. The threshold count TRAN_THRESH of transition detector 190 may be varied via control interface 160, shown in FIG. 2.

The above embodiments of the present invention are illustrative and not limitative. The invention is not limited by the type of integrated circuit embodying the present invention. The invention may be applied to any system where DC balanced serial data is to interconnect elements within the system. Any system that may benefit from speedier recognition of the loss of framing faster than multiple frame times, and which may or may not be able to use analog signal detect circuitry is adapted to benefit from the use of the present invention. The invention is not limited by the type of integrated circuit in which the present invention may be disposed. Nor is the invention limited to any specific type of process technology, e.g., CMOS, Bipolar, or BICMOS that may be used to manufacture the present invention. Other additions, subtractions or modifications are obvious in view of the present invention and are intended to fall within the scope of the appended claims.

What is claimed is:

1. A data detection system comprising:
    a consecutive identical digit (CID) detector configured to detect whether received data includes a CID exceeding a predetermined threshold count;
    a DC balance monitor configured to detect DC imbalances in the received data; and
    a transition density detector configured to detect whether there exits minimum transition density in the received data during a given time period.
    wherein the data system forces an out of frame condition if the DC balance monitor detects DC imbalances greater than a second predetermined threshold value.

2. The data detection system of claim 1 wherein the received data is a scrambled SONET or SDH data.

3. The data detection system of claim 2 wherein the received data is processed by an analog receiver.

4. The data detection system of claim 3 wherein the data detection system further comprises:
    a B1 byte monitor configured to monitor the B1 byte of frames in which the received data is disposed so as to determine whether framing is achieved.

5. The data detection system of claim 4 further comprising a frame alignment block configured to determine whether a predefined number of frames have a correct start of frame sequence at a correct time interval.

6. The data detection system of claim 5 further comprising a control interface configured to set the predetermined threshold count in the CID detector, an imbalance threshold in the DC balance monitor, and the minimum transition density in the transition density detector.

7. The data detection system of claim 6 wherein the control interface is further configured to report status of each of the CID detector, DC balance monitor, and transition density detector.

8. The data detection system of claim 4 wherein the frame alignment block further comprises:
    A pattern search logic configured to search for presence of a first programmable number of A1 bytes and a second programmable number of A2 bytes in the received frames.

9. The data detection system of claim 4 wherein the frame alignment block further comprises:
    a pattern search logic configured to search for presence of a first programmable number of A1 bytes and a second programmable number of A2 bytes in the received frames; and
    a transition timer.

10. The data detection system of claim 9 wherein the DC imbalance monitor further comprises:
    a sample balance calculation block configured to compute the imbalance between the number of logical 1's and 0s' in each N-bit wide received data;
    a decay timing block configured to compute the interval at which the DC imbalance count is decayed;
    an accumulation block configured to subtract the computed the imbalance between the number of logical 1's and 0s' from a signal generated in response to the interval computed by the decay timing block; and
    an error checking block configured to generate an error signal if the DC balance monitor detects an imbalance in the number of 1's and 0's of the received data stream.

11. The data detection system of claim 10 wherein the CID detector and transition density detector share common logic blocks.

12. The data detection system of claim 11 wherein the predefined time period associated with the transition density detector is a programmable time period.

13. The data detection system of claim 1 wherein the minimum transition density is sufficient to enable a control locked loop circuitry to recover the data.

14. The data detection system of claim 1 wherein the data system forces an out of frame condition if the CID detector detects that the received data includes a CID exceeding the predetermined threshold count.

15. The data detection system of claim 1 wherein the data system forces an out of frame condition if the transition density detector detects that minimum transition density does not exist in the received data during the given time period.

16. The data detection system of claim 14 wherein the data system further generates an Alarm Indication Signal if the CID detector detects that the received data includes a CID exceeding the predetermined threshold.

17. The data detection system of claim 1 wherein the data system further generates an Alarm Indication Signal if the DC balance monitor detects DC imbalances greater than the second predetermined threshold value.

18. The data detection system of claim 15 wherein the data system further generates an Alarm Indication Signal if the transition density detector detects that minimum transition density does not exist in the received data during the given time period.

19. A method of detecting errors in data via a network, the method comprising:
    detecting whether the data includes a consecutive identical digit (CID) exceeding a predetermined threshold count;
    detecting DC imbalances in the received data;
    detecting whether there exits minimum transition density in the received data during a predefined time period; and
    forcing an out of frame condition if it is detected that DC imbalances are greater than a second predetermined threshold value.

20. The method of claim 19 wherein the received data is a scrambled SONET or SDH data.

21. The method of claim 20 wherein the received data is processed by an analog receiver.

22. The method of claim 21 further comprising:
    monitoring B1 byte of frames in which the data is disposed so as to determine whether framing is achieved.

23. The method of claim 22 further comprising:
    determining whether a predefined number of frames have correct start of frame sequence at a correct time interval.

24. The method of claim 23 further comprising:
    setting the predetermined threshold count, an imbalance threshold, and the minimum transition density via a control interface.

25. The method of claim 24 further comprising:
    searching for presence of a first programmable number of A1 bytes and a second programmable number of A2 bytes in the received frames.

26. The method of claim 25 further comprising:
    computing an imbalance between the number of logical 1's and 0s' in each N-bit wide received data;
    computing the interval at which the DC imbalance count is decayed;
    subtracting the computed the imbalance between the number of logical 1's and 0s' from a signal generated in response to the interval computed by the decay timing block; and
    generating an error signal if the DC balance monitor detects an imbalance in the number of 1's and 0's of the received data stream.

27. The method of claim 19 wherein the minimum transition density is sufficient to enable a control locked loop circuitry to recover the data.

28. The method of claim 19 further comprising:
    forcing an out of frame condition if it is detected that the received data includes a CID exceeding the predetermined threshold count.

29. The method of claim 19 further comprising:
    forcing an out of frame condition if it is detected that minimum transition density does not exist in the received data during the given time period.

30. The method of claim 28 further comprising:
    generating an Alarm Indication Signal if it is detected that the received data includes a CID exceeding the predetermined threshold.

31. The method of claim 29 further comprising:
    generating an Alarm Indication Signal if it is detected that DC imbalances exists in the received data.

32. The method of claim 30 further comprising:
    generating an Alarm Indication Signal if it is detected that minimum transition density does not exist in the received data during the given time period.

* * * * *